Patented Sept. 21, 1943

2,329,707

UNITED STATES PATENT OFFICE 2,329,707

METAL ORGANOPHOSPHATES AND METHOD OF PREPARING THE SAME

Bruce B. Farrington, James O. Clayton, and John T. Rutherford, Berkeley, Calif., assignors to Standard Oil Company of California, San Francisco, Calif., a corporation of Delaware No Drawing. Application January 13, 1941, Serial No. 374,244

12 Claims. (Cl. 260—429)

This invention comprises new compounds and methods of preparing the same. More particularly, the invention relates to salts of amphoteric polyvalent metals selected from the group consisting of aluminum, chromium and tin and of acids of phosphorus having an organic substituent. The aluminum, chromium and tin salts of substituted acids of phosphorus containing an organic substituent having a radical of hydrocarbon structure containing more than five carbon atoms have not been prepared heretofore. These compounds comprise new and useful compositions of matter. The preferred compositions comprise those in which the salt contains an alkyl radical or an alkaryl radical with at least six carbon atoms, and preferably more than ten carbon atoms.

The new compounds comprising the subject matter of this invention are preferably the aluminum, chromium or tin salts of substituted oxyacids of pentavalent phosphorus of the following type formulae:

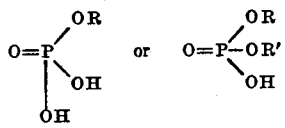

where R and R' are radicals of hydrocarbon structure, such as alkyl, aryl, alkaryl, aralkyl or cyclic nonbenzenoid radicals. Substituted phosphoric acids containing more than ten carbon atoms are preferred. Examples of preferred type acids are alkyl or alkaryl substituted phosphoric acids having twelve to twenty carbon atoms in a radical. However, it is to be understood that the broader aspects of the invention include other substituted oxyacids of phosphorus as the acid component of the salts. Additional examples of substituted oxyacids of phosphorus which may be used in forming the metal salts of the present invention are as follows:

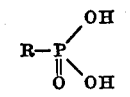

Phosphonic acid

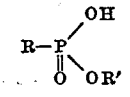

Monoester of phosphonic acid

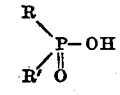

Phosphinic acid

In all of the above formulae, R and R' are radicals of hydrocarbon structure such as alkyl, aryl, alkaryl, aralkyl or cyclic nonbenzenoid radicals.

In the foregoing and throughout the specification and claims the term "radical of hydrocarbon structure" includes:

(a) Alkyl radicals, such as hexyl, heptyl, octyl, the isomeric octyls, lauryl, dodecyl (normal or branched chain), tetradecyl and cetyl (normal or branched chain) radicals;

(b) Aryl, such as the phenyl, diphenyl and naphthyl, radicals;

(c) Aralkyl, such as phenyl-stearyl and similar alkyl radicals connected to the benzene ring of the phenol and having an aryl group as a substituent in the alkyl chain;

(d) Alkaryl, such as benzyl and other radicals where the aryl group is directly attached to the benzene nucleus of the phenol and is substituted with an alkyl group;

(e) Cyclic nonbenzenoid radicals, such as cyclohexanyl or other alicyclic radicals;

(f) Oxy radicals such as those in which the hydrogen of an hydroxyl group has been replaced by esterification, etherification, neutralization with a metal, or the like;

(g) Radicals containing thio, amino, halogen or other groups.

In general, aluminum, chromium and tin salts of substituted derivatives of oxyacids of phosphorus such as phosphorous acid, $H_3PO_3$; hypophosphoric acid, $H_2PO_3$; orthophosphoric acid, $H_3PO_4$; pyrophosphoric acid, $H_4P_2O_7$; are contemplated as within the broader aspects of the invention. By "substituted" or "substituted derivatives of" acids of phosphorus whenever used herein, it is intended to designate acids containing a radical of hydrocarbon structure of the types previously listed. The organic groups may be either directly attached to the phosphorus atom of the compound or attached thereto through an intervening atom. The term "oxyacids of phosphorus" designates throughout the specification and claims acids of phosphorus in which at least one oxygen atom intervenes between a carbon and phosphorus atom of the ester.

The preferred acids are substituted orthophosphoric acids. Examples of preferred salts are: aluminum cetyl phosphate, aluminum octadecyl phosphate, aluminum "spermol" phosphate, aluminum oleyl phosphate, aluminum "spermenyl" phosphate, aluminum cetyl phenyl phosphate, aluminum di-(amylphenyl) phosphate, aluminum naphthenyl phosphate, aluminum di-cyclohexanyl phosphate, aluminum di-stearoglyceryl phosphate, aluminum tetra-chloro-octadecyl phosphate, aluminum di-(6-chloro, 2-phenyl phenyl) phosphate, aluminum di-(3-methyl, 4-chloro phenyl) phosphate; chromium cetyl phosphate, chromium octadecyl phosphate, chromium "spermol" phosphate, chromium oleyl phosphate, chromium "spermenyl" phosphate, chromium cetyl phenyl phosphate, chromium di-(amylphenyl) phosphate, chromium naphthenyl phosphate, chromium di-cyclohexanyl phosphate, chromium di-stearoglyceryl phosphate, chromium tetra-chloro-octadecyl phosphate, chromium di-(6-chloro, 2-phenyl phenyl) phosphate, chromium di-(3-methyl, 4-chloro phenyl) phosphate; tin cetyl phosphate, tin octadecyl phosphate, tin "spermol" phosphate, tin oleyl phosphate, tin "spermenyl" phosphate, tin cetyl phenyl phosphate, tin di-(amylphenyl) phosphate, tin naphthenyl phosphate, tin di-cyclohexanyl phosphate, tin di-stearoglyceryl phosphate, tin tetrachloro-octadecyl phosphate, tin di-(6-chloro, 2-phenyl phenyl) phosphate, tin di-(3-methyl, 4-chloro phenyl) phosphate.

The novel compounds herein disclosed are useful as antioxidants, as ingredients in compositions such as hydrocarbon fuels, lubricating oils, drying oils, varnishes and the like. These compounds also comprise useful base materials for synthetic organic processes for the production of compounds where it is desirable to introduce a substituent containing a substituted acid of phosphorus of the present type.

The substituted oxyacids of phosphorus utilized in the present invention may be prepared by methods known in the art. For example, a mixture of a higher alcohol and phosphorus pentoxide in ethyl ether may be refluxed for several hours. The reaction by which the substituted phosphoric acid is formed in this operation is believed to be represented by the following equation:

$$ROH + C_2H_5OC_2H_5 + P_2O_5 \rightarrow RC_2H_5HPO_4 + C_2H_5PO_3$$

where R is an alkyl radical. The alkyl ethyl phosphoric acid is soluble in ether, while the ethyl metaphosphate is not, and the ether solution of the former may be separated from the latter by decantation. Table I gives a number of examples of substituted phosphoric acids suitable for the purposes of this invention and a brief indication as to their method of preparation.

TABLE I

| Acid | Method of preparation |
|---|---|
| Mono-cetylphosphoric | 9.25 lb. cetyl alcohol and 5.61 lb. P₂O₅ were refluxed with 5 gal. ethyl ether for 24 hr. Cetylphosphoric acid solution decanted. |
| Mono-"spermol" phosphoric | 112 gms. solid sperm alcohols, 60 gms. P₂O₅, and 400 gms. ethyl ether treated as above. |
| Mono-octadecylphosphoric | 100 gms. octadecanol and 150 cc. benzene treated with 56.8 gms. POCl₃. Product was hydrolyzed to give a free acidic hydrogen. |
| Di-(6-chloro-2-phenyl-phenyl) phosphoric | 100 gms. of the phenol and 50 gms. P₂O₅ heated to 180° for 18 hr. |
| Mono-oleylphosphoric | 107 gms. oleyl alcohol and 28.5 gms. P₂O₅ were refluxed in ethyl ether for 24 hours. |
| Mono-"spermenyl"phosphoric | 107 gms. liquid sperm alcohols and 27 gms. P₂O₅ refluxed in ethyl ether for 24 hours. |
| Dicyclohexanylphosphoric | 150 gms. cyclohexanol and 87 gms. P₂O₅ refluxed with 150 gms. ethyl ether for 24 hours. |
| (Cetylphenyl) phosphoric | 688 gms. cetyl phenol and 316 gms. P₂O₅ refluxed with ethyl ether for 24 hours. |
| Di-(amylphenyl) phosphoric | 100 gms. amyl phenol and 43 gms. P₂O₅ heated to 185° F. for 15 hours. |
| Mono (tetrachloro) octadecylphosphoric | 190 gms. tetrachloro-octadecanol and 28 gms. P₂O₅ refluxed with ethyl ether for 17 hours. |

In preparing the metal salts herein involved, the ethyl group in the ethyl phosphoric acid above-mentioned may be hydrolyzed off to form the metal salt of the monoalkyl orthophosphoric acid, i. e. the salt of RH₂PO₄. This type of operation is not limited to the alkyl derivatives but includes aryl ethyl phosphoric acid, alkaryl ethyl phosphoric acid, aralkyl ethyl phosphoric acid and ethyl phosphoric acids containing a cyclic nonbenzenoid group.

The metal salts of the various substituted oxyacids of phosphorus may be conveniently prepared by reacting the acid with sodium hydroxide or potassium hydroxide and then precipitating the desired metal salt from the solution of the sodium or potassium salt by the addition of the aluminum, chromium or tin ion as desired.

The salts may also be prepared in an environment substantially free of water, for example, by the reaction of aluminum chloride with the free substituted acids of phosphorus. The aluminum salts prepared in a non-aqueous environment are, in general, soft low-melting solids while the corresponding salts prepared by precipitation from aqueous solutions are hard, nonmelting solids.

When the aluminum compounds of this invention are prepared by precipitating the aluminum salt from an aqueous solution, as above described, e. g. by addition of a solution of aluminum sulfate or aluminum chloride to a neutral or alkaline solution of an alkali metal salt of the substituted acid of phosphorus, the resulting salts are basic aluminum salts and contain aluminum in an amount greater than that represented by the stoichiometrical proportion necessary for neutralizing the acid of phosphorus. The composition of these basic aluminum salts may be represented by the formulae:

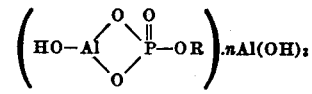

and

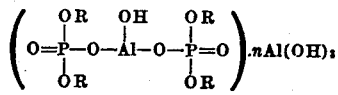

where $n$ has a value of from approximately 1.5 to approximately 3, and R is a radical of hydrocarbon stucture as previously indicated. The first formula above represents the compound formed when starting with a monosubstituted, e. g. monoalkyl or monoaryl, phosphoric acid; while the second represents the compound formed when starting with a disubstituted, e. g. dialkyl or diaryl, phosphoric acid.

The following are specific examples of metal cetyl phosphates. A solution of potassium cetyl phosphate was prepared by suspending 100 gms. of cetyl phosphoric acid in 6000 gms. of water heated to 190° F. and neutralizing this with a 10% solution of potassium hydroxide. The neutral point was determined both by means of phenolphthalein and a pH meter. The caustic was added until the pink color just appeared, giving a pH of 9.7. This solution (A) was used and the metal salts prepared by adding aluminum sulfate or aluminum chloride, chrome alum, and stannous chloride, respectively, thereto.

Aluminum salts of other substituted acids of phosphorus were also prepared by similar methods and may be briefly described as follows:

EXAMPLE 1.—*Aluminum cetyl phosphate.*—This compound is a salt of a cetyl phosphoric acid prepared by heating cetyl alcohol with phosphorus pentoxide.

| | Per cent |
|---|---|
| Salt | 55.8 |
| Al(OH)₃ | 39.2 |
| Organic material | 5.0 |

EXAMPLE 2.—*Aluminum dicyclohexanyl phosphate.*—The parent acid of this salt was prepared by heating cyclohexanol with phosphorus pentoxide.

| | Per cent |
|---|---|
| Salt | 70.3 |
| Al(OH)₃ | 23.5 |
| Organic material | 6.2 |

EXAMPLE 3.—*Aluminum naphthenyl phosphate.*—The compound is a salt of naphthenyl phosphoric acid prepared from naphthneic alcohols and phosphorus pentoxide. The naphthenic alcohol was prepared by reducing naphthenic acid.

| | Per cent |
|---|---|
| Salt | 64.6 |
| Al(OH)₃ | 22.7 |
| Organic material | 2.7 |

EXAMPLE 4.—*Aluminum "spermenyl" phosphate.*—The corresponding acid was prepared by heating sperm oil alcohols with phosphorus pentoxide.

| | Per cent |
|---|---|
| Salt | 89.3 |
| Al(OH)₃ | 1.85 |
| Organic material | 8.85 |

EXAMPLE 5.—*Aluminum di-(3-methyl, 4-chloro phenyl) phosphate.*—This compound was prepared by precipitating the aluminum compound from an aqueous solution of the sodium salt of the substituted phosphoric acid. As much as twenty times the theoretical amount of aluminum sulfate was added before precipitation of the aluminum salt was completed, resulting in the co-precipitation of a large amount of aluminum hydroxide to form what is termed in the present specification "a basic aluminum salt."

Chromium and tin cetyl phosphates are prepared from solution A previously mentioned by the following specific procedures:

EXAMPLE 6.—*Chromium cetyl phosphate.*—To 600 cc. of (A), 185 cc. of a 10% solution of chrome alum was added while stirring vigorously. This corresponds to about a 50% excess of the chromium salt. The pH of the solution was maintained at 9.25 to 9.75. A green precipitate was formed which, on filtering and drying, analyzed 12.84% chromium. This corresponds to the formula—

$$CR(OH)_{16}H_{33}PO_4$$

EXAMPLE 7.—*Tin cetyl phosphate.*—To 600 cc. of (A), 90 cc. of a 10% solution of stannous chloride dihydrate was added while stirring vigorously. This corresponds to a 10% excess of tin salt. The pH of the solution was maintained between 9.25 and 9.75. A white precipitate was formed which analyzed 35.27% tin. Since the theoretical figure for tin cetyl phosphate is 27.2%, this indicates the formation of some basic salt.

In Table II are given typical compounds together with a brief notation of the method utilized in preparing the acid component of the compound and the particular alkali metal salt from which the desired salt was precipitated by double decomposition in aqueous solution:

TABLE II

| Compound | Preparation of compound | |
|---|---|---|
| | Acid | Salt prepared from— |
| Aluminum lauryl phosphate. | Commercial lauryl phosphoric acid. | Na salt. |
| Aluminum cetyl phosphate. | Cetyl alcohol+P₂O₅+ether.. | Do. |
| Do. | Cetyl alcohol+P₂O₅+ether.. | K salt. |
| Aluminum octadecyl phosphate. | Octadecyl alcohol+POCl₃+C₆H₆. | Na salt. |
| Aluminum "spermol" phosphate. | Solid sperm alcohols+P₂O₅+ether. | Do. |
| Aluminum oleyl phosphate. | Oleyl alcohol+P₂O₅+ether.. | Do. |
| Aluminum "spermenyl" phosphate. | Liquid sperm alcohol+P₂O₅+ether. | Do. |
| Aluminum di-cyclohexanyl phosphate. | Cyclohexanol+P₂O₅+ether. | Do. |
| Aluminum di-(amyl-phenyl) phosphate. | Amylphenol+P₂O₅ | Do. |
| Aluminum di-stearo-glyceryl phosphate. | Glyceryl distearate+P₂O₅+ether. | Do. |
| Aluminum tetra-chloro-octadecyl phosphate. | Tetra-chloro-octadecanol+P₂O₅+ether. | Do. |
| Chromium cetyl phosphate. | Cetyl alcohol+P₂O₅+ether.. | K salt. |
| Tin cetyl phosphate | Cetyl alcohol+P₂O₅+ether.. | Do. |

The normal, as distinguished from basic, salts of aluminum, chromium and tin may be prepared. For example, normal aluminum salts are obtainable by direct reaction of aluminum chloride with cetyl phosphoric acid, as previously mentioned. Likewise, normal tin salts can be obtained by neutralization of the free substituted acid of phosphorus with metallic tin or by reaction of tin chloride with the free acid to yield the salt and hydrochloric acid. Chromium oxide may be reacted with free substituted phosphoric acid to give a normal salt. All such reactions are in nonaqueous environment.

Table III is a list of compounds prepared together with yields obtained in per cent of theoretical.

TABLE III

Yield, 4 per cent of theoretical

| | |
|---|---|
| Aluminum cetyl phosphate | 82 |
| Aluminum diamylphenyl phosphate | 64 |
| Aluminum stearyl phosphate | 60 |
| Aluminum ocenol phosphate | 90 |
| Aluminum "spermenyl" phosphate | 97 |
| Aluminum cyclohexanyl phosphate | 26 |
| Aluminum 6-chloro-2-phenyl-phenyl phosphate | 55 |
| Aluminum 3-methyl-4-chlorophenyl phosphate | 100 |
| Aluminum tetrachloro-octadecanol phosphate | 50 |

The metal salts of this invention are water-insoluble. Because of water-insolubility these salts have properties distinctly different from alkali metal salts which are said to be useful as wetting agents. The aluminum, chromium and tin salts form more stable solutions in hydrocarbon oils than do the alkali metal salts which precipitate out in the presence of moisture and also accelerate susceptibility to foaming. The compounds of this invention are noncorrosive to metals, and especially to aluminum, to copper-lead and to cadmium-silver alloys which are corroded at elevated temperatures by alkali metal salts dissolved in mineral oils.

While the character of the invention has been described in detail and numerous examples of the compounds given, this has been done by way of illustration only and with the intention that no limitation should be imposed upon the invention

We claim:

1. An amphoteric polyvalent metal salt of an oxyacid of phosphorus having a radical of hydrocarbon structure with more than five carbon atoms, said amphoteric polyvalent metal being selected from the group consisting of aluminum, chromium and tin.

2. An amphoteric polyvalent metal salt of an acid of phosphorus having the type formula—

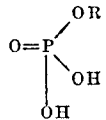

where R is a radical of hydrocarbon structure with more than five carbon atoms, said amphoteric polyvalent metal being selected from the group consisting of aluminum, chromium and tin.

3. An amphoteric polyvalent metal salt of an acid of phosphorus having the type formula—

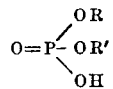

where R and R' are radicals of hydrocarbon structure with more than five carbon atoms, said amphoteric polyvalent metal being selected from the group consisting of aluminum, chromium and tin.

4. A basic aluminum salt of an oxyacide of phosporus having a radical of hydrocarbon structure with more than five carbon atoms.

5. A basic chromium salt of an oxyacid of phosphorus having a radical of hydrocarbon structure with more than five carbon atoms.

6. A basic tin salt of an oxyacid of phosphorus having a radical of hydrocarbon structure with more than five carbon atoms.

7. A process of preparing an amphoteric polyvalent metal salt of an oxyacid of phosphorus substituted by a radical of hydrocarbon structure with more than five carbon atoms which comprises contacting an aqueous solution of a water-soluble salt of a substituted oxyacid of phosphorus containing said hydrocarbon radical with a water-soluble salt of an amphoteric polyvalent metal selected from the group consisting of aluminum, chromium and tin, and maintaining the solution alkaline and above pH 9 during a major portion of the precipitating operation.

8. A process of preparing a basic aluminum salt of an oxyacid of phosphorus containing a hydrocarbon substituent with more than five carbon atoms which comprises contacting an aqueous solution of a water-soluble salt of a substituted oxyacid of phosphorus containing said hydrocarbon radical with a water-soluble salt of aluminum to precipitate the aluminum salt of said oxyacid of phosphorus, and maintaining the solution alkaline and above pH 9 during a major portion of the precipitating operation.

9. An amphoteric polyvalent metal salt of an oxy acid of phosphorus having an alicyclic radical with more than five carbon atoms, said amphoteric polyvalent metal being selected from the groups consisting of aluminum, chromium and tin.

10. An amphoteric polyvalent metal salt of an oxy acid of phosphorus substituted by a cyclohexanyl radical, said amphoteric polyvalent metal being selected from the group consisting of aluminum, chromium and tin.

11. An amphoteric polyvalent metal salt of an oxyacid of phosphorus having an alkaryl radical, said substituted acid of phosphorus containing more than ten carbon atoms, said amphoteric polyvalent metal being selected from the group consisting of aluminum, chromium and tin.

12. An amphoteric polyvalent metal salt of an oxy acid of phosphorus substituted by an alkylphenyl radical, said amphoteric polyvalent metal being selected from the group consisting of aluminum, chromium and tin.

BRUCE B. FARRINGTON.
JAMES O. CLAYTON.
JOHN T. RUTHERFORD.